Dec. 3, 1946.   J. E. CROUCH   2,412,130
ASTRONOMICAL DEVICE
Filed Jan. 25, 1944   3 Sheets-Sheet 2

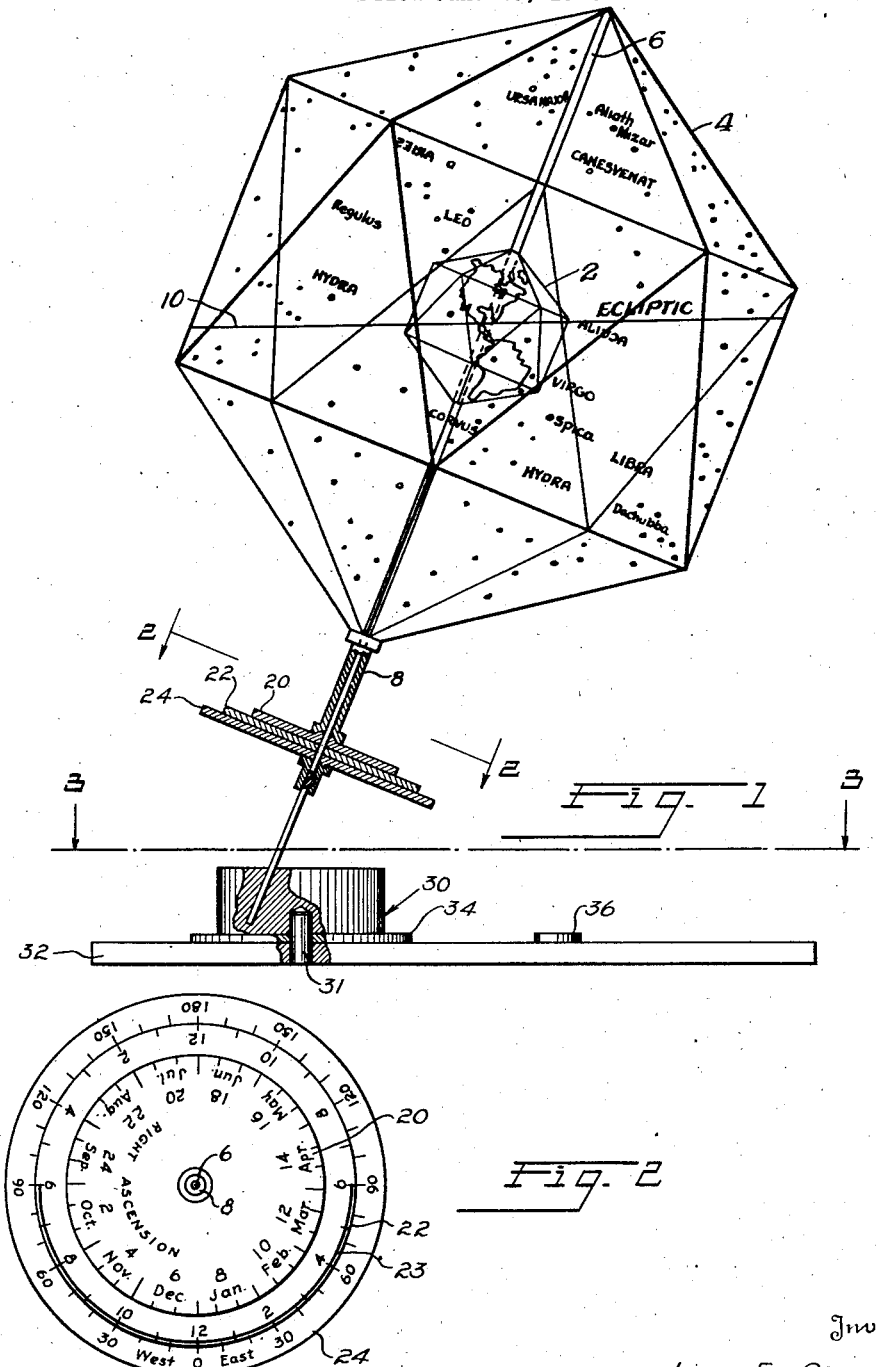

Inventor
JOEL E. CROUCH
By
Attorney

Dec. 3, 1946.   J. E. CROUCH   2,412,130
ASTRONOMICAL DEVICE
Filed Jan. 25, 1944   3 Sheets-Sheet 3

Inventor
JOEL E. CROUCH
By Schwaier & Parker
Attorney

Patented Dec. 3, 1946

2,412,130

UNITED STATES PATENT OFFICE 2,412,130

ASTRONOMICAL DEVICE

Joel E. Crouch, State College, Pa.

Application January 25, 1944, Serial No. 519,680

18 Claims. (Cl. 35—46)

This invention relates to devices for studying the heavenly bodies (hereinafter called the stars), their position and relation to each other and their position and relation with respect to any point on the earth's surface.

It is a particular object of the invention to provide such a device which may be operated to illustrate the stars appearing over any part of the earth's surface at any given date or time of day whatsoever and to provide an improved visual representation of the heavens as they appear at any time and at any place. A further object is to provide a new and improved device for illustrating the apparent path of the sun on the ecliptic.

These and other objects of the invention are achieved by the device described in the following specification and illustrated in the accompanying drawings which, it will be understood, are merely illustrative of the invention and impose no limitation thereon not imposed by the appended claims.

In the drawings forming part of this application, wherein similar reference numerals refer to like parts, Fig. 1 is an elevational view of a device according to my invention;

Fig. 2 is a view of the dials shown in Fig. 1, being taken on line 2—2 of Fig. 1;

Figure 3:
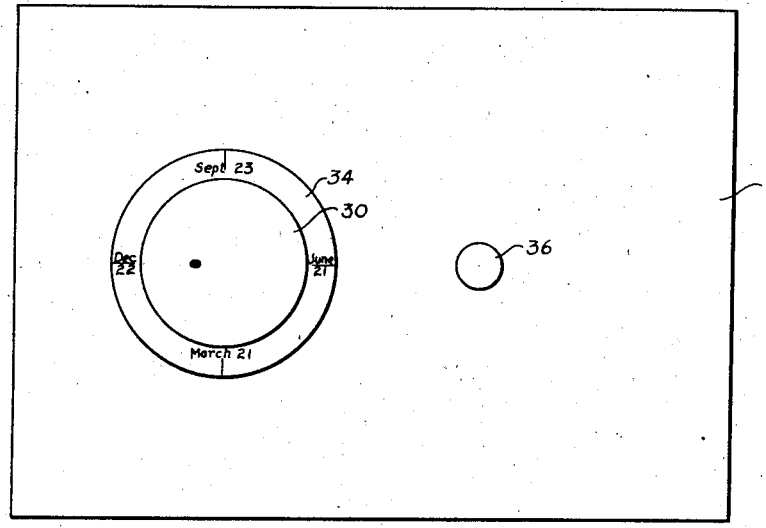
Fig. 3 is a view taken on line 3—3 of Fig. 1.

My invention primarily provides a device whereby the aspect of the heavens over any point or location on the earth's surface may be viewed. The device is adapted to represent terrestrial and celestial spheres and the term sphere or globe as used hereinafter refers to an article suggesting spherical bodies although the shape of the articles concerned may only approximate a sphere or globe. The invention comprises basically a polyhedron or sphere 2, which is preferably opaque, but which may be transparent or semi-transparent to permit internal illumination, and on the surface of which is shown a map of the earth's surface, and a second polyhedron or sphere 4 which is concentric with and surrounds the first, which is transparent, and on which are shown the stars in the proper relative positions and locations. These devices may be spherical or of any suitable polyhedral form but are preferably icosahedral. The terrestrial representation 2 may be a solid block but the celestial representation 4 is preferably hollow and formed, constructed and its parts joined in the manner and by the means disclosed and claimed in my co-pending application Serial No. 519,681, filed January 25, 1944, for Icosahedral map.

Means are provided by the invention for supporting the terrestrial and celestial globes (both of which may be polyhedral or spherical) in the described concentric relationship and for permitting their adjustment to such relation that the celestial globe shows the stars over any desired point or area of the terrestrial globe at any time. Such means comprise a shaft 6 which extends diametrically through both globes and to which the terrestrial globe 2 is attached. As the globes herein described are icosahedral the shaft preferably extends through opposite apices of each of them as illustrated in the drawings. The celestial globe 4 is not attached to the shaft 6 but is free to rotate about it and is supported thereon by a sleeve 8 which surrounds the shaft and to which the globe 4 is attached for rotation therewith independently of the rotation of shaft 6 and terrestrial globe 2.

It will be seen that by the described arrangement any part or area of the celestial globe may be made to appear over any part or area of the terrestrial globe over which the stars represented on such part of the celestial globe will actually appear at some time. The celestial globe, of course, shows the stars as they appear from a point outside the universe and, when observed from the exterior, the positions of the stars with respect to the underlying part of the earth's surface are reversed. If it is desired to view the celestial globe 4 in such a way that the stars appear exactly as they do when viewed from the earth's surface that part of the globe 4 which includes the stars to be viewed may be viewed from the opposite side of the globe.

Means are provided by the invention for setting the two globes with respect to each other in such a way that the stars actually appearing over each part of the earth's surface at any given date and time are represented in proper location and relation on the celestial globe 4 above the representation of that part of the terrestrial globe 2. Such means comprise three concentric discs 20, 22, 24 which surround the shaft 6 and are of graduated size. Upper disc 20 is attached to sleeve 8 for rotation therewith and with the celestial globe 4 and is marked on its face with numbers representing the right ascension of the celestial sphere and is also divided and marked throughout its periphery with the months and days of the year. The lower disc 24 is the largest of the three and is attached to the shaft 6 for rotation therewith and with the terrestrial globe 2. The periphery of this disc or dial is graduated in degrees of longitude, extending from 0 to 180° in east and west directions. The middle dial 22 is smaller than dial 24 and larger than dial 20 and is free to rotate with respect to both. The periphery of this dial is graduated in twenty-four hours of time which may be a single series from 0 to 24 (or 0000 to 2400 as is often used) or two series, each from 0 to 12. I have found it helpful to mark one-half of dial 22 with a band 23 to indicate the scale representing the night hours. The upper and middle dials 20 and 22, respectively, are used to convert the mean solar time shown on the middle dial to mean sidereal time. The middle and lower dials 22 and 24, respectively, are used to bring the celestial globe into proper alignment and position with respect to the terrestrial globe for any given date and time.

In the operation of the described device, if it is desired to view the stars as they will appear over New York city at one o'clock a. m. on January 10, the time—one o'clock a. m.—on the middle dial 22 is set opposite the representation of the longitude of New York city on the lower dial. This relation of the middle dial to the lower dial and the terrestrial sphere is kept fixed and the upper dial 20 and the celestial globe attached thereto are rotated until the date January 10 on the upper dial is opposite the midnight indication on the middle dial. The celestial sphere 4 will now be in such position that it will show the stars above New York city in the exact position and location which they will occupy at one o'clock a. m. on January 10, and will also show all the other stars in their proper positions relative to each point on the earth's surface at one o'clock a. m. at New York city. Dial 22 now shows the local time for the different longitudes shown on dial 24 when it is one o'clock a. m. in New York city.

While it is preferred that the three dials 20, 22, 24 be provided, the middle dial 22, on which is shown a time scale, may be omitted without affecting the operability of the device for the described purposes. If such dial is omitted it is necessary to know the sidereal time or right ascension for the particular point on the earth's surface for which the positions of the heavenly bodies are of interest. This may be obtained from tables or by calculation. Having this information, the two globes are brought into proper relation by setting the right ascension (or sidereal time) as shown on the dial 20, which is attached to the celestial globe 4, opposite the longitude of the point on the earth's surface, as shown on dial 24, which is attached to the terrestrial globe 2. This operation will bring the two globes into the proper and desired relationship.

In order to give an accurate representation of the position of the sun with reference to the earth on its orbit and to the celestial sphere on different days of the year, the shaft 6 may be rotatably supported at an angle of 23½° to the vertical in a block 30 carried by a base 32. The block 30 is rotatably mounted about its central vertical axis on a pin 31 and has attached to it a dial 34 which is rotatable about the same axis and is marked with an annular series of representations of the dates March 21, June 21, September 23 and December 22 spaced 90° apart, all as shown in Figs. 1 and 3. Also mounted on the base 32 in spaced relation to the block 30 and dial 32 is a part 36 which represents the sun and which may be of any suitable size and shape.

It will be seen that if the dial 32 and block 30 are rotated so that any desired date on dial 32 points toward the representation 36 of the sun, the axis 6 of the terrestrial globe will have the correct inclination with respect to the sun, e. g. toward it on June 21 and away from it on December 22.

Figure 4:
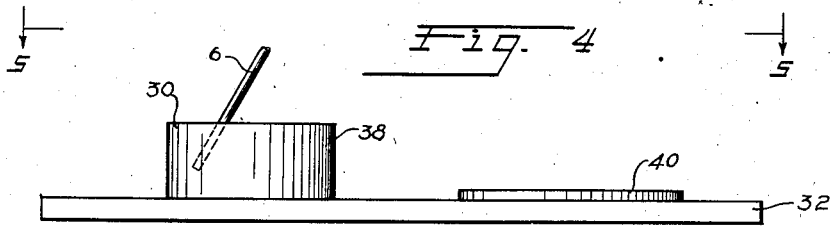
Fig. 4 is a view of parts shown in Fig. 1 showing a modified form of the invention.
Figure 5:
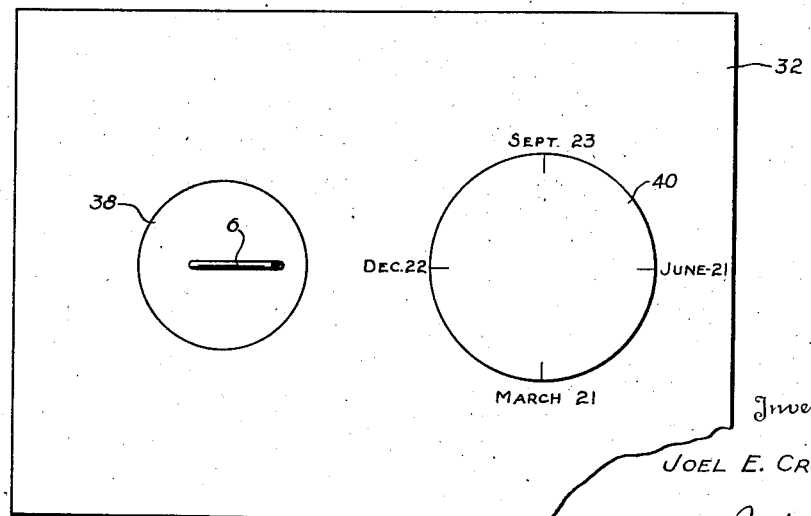
Fig. 5 is a view taken on line 5—5 of Fig. 4.

A modified, and preferred, structure embodying means for representing the correct angular position of the earth's axis is shown in Figs. 4 and 5. In this embodiment the block 38 is fixed to the base 32 and a dial 40, which is marked similarly to dial 34 is fixed to the base in spaced relation to block 38. In the use of this embodiment, some relatively distant object such as a lamp, window, etc., is assumed to be the sun and the base 32 is rotated to such a position that any desired date thereon points at the selected "sun," whereupon the axis 6 of the terrestrial globe will be in the correct angular relation to the "sun."

In the use of the device the apparent path of the sun on the ecliptic may be illustrated in several ways. For example, if the preferred embodiment shown in Figs. 4 and 5, is used, the apparent path may be illustrated by first setting the dial 20 so that the indication December 22 thereon is at the lowest point, i. e. opposite December 22 on the scale 40. The celestial globe is now held in the position so fixed with respect to the base, and the entire apparatus is rotated to such a position that a selected date on the scale 40 points toward a "sun" selected in the manner described. The "sun" will now be in its true relationsip to the celestial globe 4. Dial 22 may now be set so that midnight thereon is opposite the date on dial 20 which corresponds to the selected date. Dial 24 is turned so that the longitude of the point of observation is aligned with the solar time at that point represented on dial 22. The terrestrial and celestial globes and the "sun" will now be in proper relation to each other for the selected date and time at the point of observation. For a different time, the terrestrial globe is turned with respect to the "sun" and the celestial globe by turning dial 24 so that the representation thereon of the longitude of the point of observation is aligned with the new selected time on dial 22.

It will be seen that by setting the dial 20 in the described manner, i. e. with the December 22 mark thereof at the lowest point, the ecliptic line 10 on the celestial globe is horizontal and the "sun" apparently travels about the path in the celestial sphere shown by this line.

Figure 6:
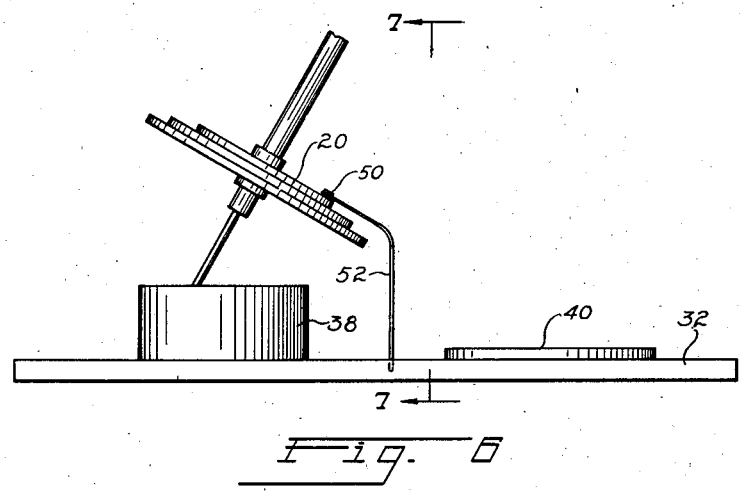
Fig. 6 is a partial view of an embodiment of my invention in which means are provided for holding the celestial globe in a desired position.
Figure 7:
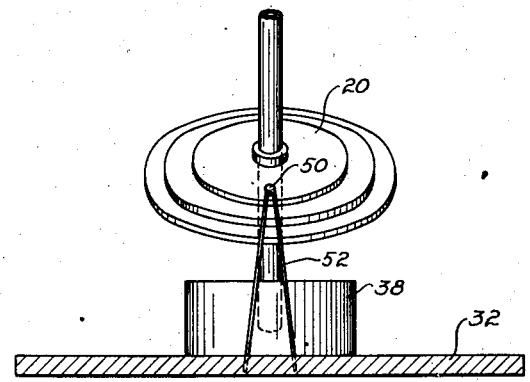
Fig. 7 is a view taken on line 7—7 of Fig. 6.

According to a further embodiment of the invention means are provided for releasably locking the celestial globe in such a position that the ecliptic line thereon is horizontal, which position is assumed by the celestial globe when the December 22 indication on dial 20 is in its lowest position. Such means are illustrated in Figs. 6 and 7 and comprise a lug 50 attached to the upper surface of dial 20 at a point opposite the December 22 mark thereon, and a wire member 52 having the general shape of a hairpin, the lower ends of which are connected to the base 32 and the closed upper end of which resiliently bears against the upper face of dial 20 adjacent the lowermost part thereof and is adapted to surround the lug when these parts are adjacent each other, in order to prevent undesired rotation of dial 20 and the celestial globe, while permitting rotation of dials 22 and 24 and the terrestrial globe to any desired position. Obviously, other means than that described may be provided for releasably holding dial 20 against rotation from the described position.

While I have described and illustrated various forms which my invention may take, it will be apparent to those skilled in the art that other embodiments, as well as modifications of those disclosed, may be made without departing in any way from the spirit or scope of the invention.

I claim:

1. A device for representing the relation of the bodies of the celestial sphere to the surface of the earth comprising a globe on the surface of which is shown a map of the earth's surface, a transparent globe having shown thereon the bodies of the celestial sphere and being concentric with and surrounding the first globe and being so oriented with respect thereto that the two globes have a common north pole-south pole axis, a scale representing 360° of longitude attached to the terrestrial globe, and a scale representing the months and days of the year attached to the celestial globe and being positioned adjacent the scale attached to the terrestrial globe whereby the two scales may be read with respect to each other.

2. A device for representing the relation of the bodies of the celestial sphere to the surface of the earth comprising a globe on the surface of which is shown a map of the earth's surface, a transparent globe having shown thereon the bodies of the celestial sphere and being concentric with and surrounding the first globe and being so oriented with respect thereto that the two globes have a common north pole-south pole axis, means supporting said globes for relative rotation about said common axis a circular dial concentric with said axis and attached to the terrestrial globe and having thereon an annular scale representing 360 degrees of longitude and a second circular dial concentric with said axis and attached to the celestial globe and having thereon an annular scale which represents the months and days of the year and which is in co-operating relation to the longitude scale.

3. A device for representing the relation of the bodies of the celestial sphere to the surface of the earth comprising a globe on the surface of which is shown a map of the earth's surface, a transparent globe having shown thereon the bodies of the celestial sphere, and being concentric with and surrounding the first globe and being so oriented with respect thereto that the two globes have a common north pole-south pole axis, means attached to the terrestrial globe and having a scale representing 360 degrees of longitude thereon, means attached to the celestial globe and having thereon a scale which represents the months and days of the year, and a third means having thereon a scale which represents the hours and minutes of the day, said three means being positioned adjacent each other whereby the scales thereon are adjacent each other and may be read with respect to each other.

4. A device for representing the relation of the bodies of the celestial sphere to the surface of the earth, comprising a globe on the surface of which is shown a map of the terrestrial sphere, a transparent globe having shown thereon the bodies of the celestial sphere, and being concentric with and surrounding the first globe and being so oriented with respect thereto that the two globes have a common north pole-south pole axis, a shaft extending diametrically through both said globes along said common axis and being attached to said terrestrial globe and supporting the celestial globe for free rotation thereon, a sleeve surrounding said shaft and being attached to the celestial globe, means connected to said shaft for rotation therewith and having a scale representing 360 degrees of longitude thereon, means connected to said sleeve for rotation therewith and having thereon a scale which represents the months and days of the year, and a third means having thereon a scale which represents the hours and minutes of the day, said three means being positioned adjacent each other whereby the scales thereon are adjacent each other and may be read with respect to each other.

5. A device for representing the relation of the bodies of the celestial sphere to the surface of the earth, comprising a globe on the surface of which is shown a map of the terrestrial sphere, a transparent globe having shown thereon the bodies of the celestial sphere, and being concentric with and surrounding the first globe and being so oriented with respect thereto that the two globes have a common north pole-south pole axis, a shaft extending diametrically through both said globes along said common axis and being attached to said terrestrial globe and supporting the celestial globe for free rotation thereon, means supporting said shaft at an angle of approximately 23½° to the vertical, and an annular scale mounted below said globes for rotation about a vertical axis and being graduated in the months and days of the year.

6. A device for representing the relation of the bodies of the celestial sphere to the surface of the earth, comprising a globe on the surface of which is shown a map of the terrestrial sphere, a transparent globe concentric with and surrounding the first globe and having shown thereon the bodies of the celestial sphere, a shaft extending through the common north pole-south pole axis of said globes, means rotatable about a vertical axis and supporting said shaft at an angle of 23½° to the vertical, and an annular scale rotatable about said vertical axis and being divided to show at least the equinoctial and solstitial times of the year.

7. A device for representing the relation of the bodies of the celestial sphere to the surface of the earth, comprising a globe on the surface of which is shown a map of the terrestrial sphere, a transparent globe concentric with and surrounding the first globe and having shown thereon the bodies of the celestial sphere, a shaft extending through the common north pole-south pole axis of said globes, means rotatable about a vertical axis and supporting said shaft at an angle of 23½° to the vertical, and an annular scale rotatable about said vertical axis and being divided to show at least the equinoctial and solstitial times of the year and means representing the sun and being spaced from said annular scale.

8. A device for representing the relation of the bodies of the celestial sphere to the surface of the earth, comprising a globe on the surface of which is shown a map of the terrestrial sphere, a transparent globe concentric with and surrounding the first globe and having shown thereon the bodies of the celestial sphere, a shaft extending through the common north pole-south pole axis of said globes, a base, fixed means carried by the base and supporting said shaft at an angle of 23½° to the vertical, and an annular scale on the base spaced from said supporting means and being divided to show at least the equinoctial and solstitial times of the year.

9. A device for representing the relation of the bodies of the celestial sphere to the surface of the earth comprising a globe on the surface of which is shown a map of the earth's surface, a transparent globe having shown thereon the bodies of the celestial sphere, and being concentric with and surrounding the first globe and being so oriented with respect thereto that the two globes have a common north pole-south pole axis, a dial attached to and rotatable with the terrestrial globe and having thereon an annular scale representing 360 degrees of longitude, a second dial attached to and rotatable with the celestial globe and having thereon an annular scale which represents the months and days of the year and which is in cooperating relation to the longitude scale, and a third dial having thereon an annular scale which represents the hours and minutes of the day and which is in cooperating relation to the longitude scale and the scale representing the months and days of the year and means engageable with the dial attached to the celestial globe to releasably hold said dial and the celestial globe from rotation with the terrestrial globe and said first and third dials.

10. A device for representing the relation of the bodies of the celestial sphere to the surface of the earth comprising a globe on the surface of which is shown a map of the earth's surface, a transparent globe having shown thereon the bodies of the celestial sphere, and being concentric with and surrounding the first globe and being so oriented with respect thereto that the two globes have a common north pole-south pole axis, a dial attached to and rotatable with the terrestrial globe and having thereon an annular scale representing 360 degrees of longitude, a second dial attached to and rotatable with the celestial globe and having thereon an annular scale which represents the months and days of the year and which is in cooperating relation to the longitude scale, and a third dial having thereon an annular scale which represents the hours and minutes of the day and which is in cooperating relation to the longitude scale and the scale representing the months and days of the year, a lug on the upper surface of the second dial opposite the representation thereon of the date December 22, and means fixed against rotation with the dials and having a part adapted to releasably engage said lug to hold said second dial and said celestial globe from rotation with said terrestrial globe and the first and third dials.

11. A device according to claim 3 in which each of the scale means is a dial having an annular scale thereon.

12. A device according to claim 3 in which each of the scale means is a dial having an annular scale thereon, all of said dials being concentric and adjacent each other whereby the scales thereon are in cooperating relation.

13. A device according to claim 3 in which each of the scale means is a dial having an annular scale thereon and the third dial is between the first and second, all of said dials being concentric and adjacent each other whereby the scale thereon are in cooperating relation.

14. A device according to claim 3 in which each of the scale means is a dial having an annular scale thereon and the third dial is between the first and second and is rotatable with respect thereto.

15. A device according to claim 4 in which the three scale means are dials having annular scales thereon.

16. A device according to claim 4, in which each of the scale means is a dial having an annular scale thereon, all of said dials being concentric and adjacent each other whereby the scales are in cooperating relation.

17. A device according to claim 4, in which each of the scale means is a dial having an annular scale thereon, and the third dial is between the first and second, all of said dials being concentric and adjacent each other whereby the scales are in cooperating relation.

18. A device according to claim 4, in which each of the scale means is a dial having an annular scale thereon and the third dial is between the first and second and is rotatable with respect thereto, all of said dials being concentric and adjacent each other whereby the scales are in cooperating relation.

JOEL E. CROUCH.